US011266061B2

(12) United States Patent
Anderson et al.

(10) Patent No.: US 11,266,061 B2
(45) Date of Patent: Mar. 8, 2022

(54) VACUUM SYSTEM

(71) Applicant: CNH Industrial America LLC, New Holland, PA (US)

(72) Inventors: Brian Anderson, Yorkville, IL (US); Chad Johnson, Arlington Heights, IL (US); Brandon Kuboushek, New Lenox, IL (US); Austin McLuckie, Coal City, IL (US)

(73) Assignee: CNH Industrial America LLC, New Holland, PA (US)

( * ) Notice: Subject to any disclaimer, the term of this patent is extended or adjusted under 35 U.S.C. 154(b) by 153 days.

(21) Appl. No.: 16/392,472

(22) Filed: Apr. 23, 2019

(65) Prior Publication Data

US 2020/0337222 A1 Oct. 29, 2020

(51) Int. Cl.
*A01C 7/08* (2006.01)
*A01C 7/04* (2006.01)

(52) U.S. Cl.
CPC .............. *A01C 7/082* (2013.01); *A01C 7/042* (2013.01)

(58) Field of Classification Search
CPC ......... A01C 7/082; A01C 7/042; A01C 7/044; A01C 7/046
See application file for complete search history.

(56) References Cited

U.S. PATENT DOCUMENTS

| 3,393,516 A | 7/1968 | Markowski |
| 4,474,511 A | 10/1984 | Labbe |
| 4,852,809 A | 8/1989 | Davis et al. |
| 5,797,793 A | 8/1998 | Matousek et al. |
| 6,443,671 B1 | 9/2002 | Weiste |
| 6,951,354 B1 | 10/2005 | Paulson |
| 7,549,383 B2 | 6/2009 | Sauder et al. |
| 7,802,651 B2 | 9/2010 | Park et al. |
| 8,001,914 B2 | 8/2011 | Peterson et al. |
| 8,443,742 B2 | 5/2013 | Orrenius |
| 8,698,057 B2 | 4/2014 | Park et al. |
| 8,861,195 B2 | 10/2014 | Fu |
| 9,031,749 B2 | 5/2015 | Hubalek et al. |
| 9,599,124 B2 | 3/2017 | Roberge et al. |
| 9,648,801 B2 | 5/2017 | Borkgren et al. |
| 9,901,026 B2 | 2/2018 | Kinzenbaw et al. |
| 10,030,796 B2* | 7/2018 | Johnson ................. A01C 7/082 |

(Continued)

FOREIGN PATENT DOCUMENTS

| CN | 203270120 | 11/2013 |
| CN | 206580298 U | 10/2017 |

(Continued)

OTHER PUBLICATIONS

Oval Exhaust Tubing 90 Degree Twist, Nov. 26, 2018.

(Continued)

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A vacuum system that includes a planter frame. A row unit bracket couples to the planter frame. A fan couples to the planter frame and draws air through a row unit. An exhaust duct extends through the row unit bracket. The exhaust duct couples to the fan and discharges airflow from the fan towards the ground.

20 Claims, 9 Drawing Sheets

(56) References Cited

U.S. PATENT DOCUMENTS

| | | | |
|---|---|---|---|
| 10,718,252 B2 | 7/2020 | Im | |
| 10,820,480 B2 | 11/2020 | Hubner | |
| 2012/0312212 A1 | 12/2012 | Cruson | |
| 2013/0327261 A1 | 12/2013 | Bergere | |
| 2016/0242352 A1 | 8/2016 | Hussherr et al. | |
| 2017/0086354 A1 | 3/2017 | Groves et al. | |
| 2017/0369257 A1 | 12/2017 | Bent et al. | |
| 2019/0216006 A1* | 7/2019 | Hubner | A01C 7/046 |
| 2019/0380260 A1* | 12/2019 | Meyer | A01C 7/082 |
| 2019/0387663 A1* | 12/2019 | Wang | A01C 7/046 |
| 2020/0329628 A1 | 10/2020 | McLuckie et al. | |

FOREIGN PATENT DOCUMENTS

| | | | | |
|---|---|---|---|---|
| DE | 102005024739 A1 * | 12/2006 | | A01C 7/042 |
| DE | 102011000996 A1 | 9/2012 | | |
| EP | 3219186 A1 | 9/2017 | | |
| IN | 904MUM2010 | 6/2010 | | |
| WO | 2012029003 | 3/2012 | | |
| WO | 2018107259 A1 | 6/2018 | | |

OTHER PUBLICATIONS 6 in. Straight Oval-to-Round Boot-OTRB6, The Home Depot, Nov. 26, 2018.

1800 Ceiling, Ceiling Air Diverter for 2'x2' Ceiling Vent, 3 pgs, retrieved on Mar. 5, 2019 from https://www.1800ceiling.com/air-diverter-white-1pack.

* cited by examiner

VACUUM SYSTEM

BACKGROUND

The present application relates generally to agricultural implements.

Planting implements (e.g., planters) are typically towed behind a tractor across fields. These planting implements typically include multiple row units distributed across the width of the implement. These row units deposit seeds at a desired spacing and soil depth, thereby establishing rows of planted seeds. Each row unit may include a seed meter that controls the rate and/or spacing of the seeds deposited in the ground. The seed meter may use a fan induced vacuum pressure to meter the seeds, which are placed in the field by a row unit. In some situations, the seeds may have a coating, such as fungicide or pesticide. During planting operations, some of the coating may separate from the seeds as the seeds contact each other. The vacuum pressure draws this coating through the metering system and then discharges it into the environment.

BRIEF DESCRIPTION

In one embodiment, a vacuum system that includes a planter frame. A row unit bracket couples to the planter frame. A fan couples to the planter frame and draws air through a row unit. An exhaust duct extends through the row unit bracket. The exhaust duct couples to the fan and discharges airflow from the fan towards the ground.

In another embodiment, a vacuum system that includes an exhaust duct that extends through a row unit bracket. The exhaust duct couples to a fan and discharges airflow from the fan towards the ground. The exhaust duct includes a front wall and a rear wall. The exhaust duct also includes a first sidewall with a first curved portion and a first straight portion. A second sidewall with a second curved portion and a second straight portion.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed above, seed planting implements generally utilize multiple row units to plant rows of seeds in the ground. Each row unit may include a seed meter to control rate and/or spacing of the deposited seeds. These seed meters utilize vacuum pressure to attach seeds to a rotating seed disc, which controls the rate at which seeds are output by the seed meter. As used herein, "vacuum pressure" is intended to describe a pressure differential from atmospheric pressure and not necessarily a true vacuum. In some situations, the seeds may have a coating, such as fungicide or pesticide. During planting operations, some of the coating may separate from the seeds as the seeds contact each other and/or as the seeds contact components of the agricultural implement. The vacuum pressure draws the separated coating through the metering system and then discharges it into the environment. In order to reduce the spread of the coating, the agricultural implement includes an exhaust duct system that directs the discharged airflow from the fan towards the ground.

Figure 1:
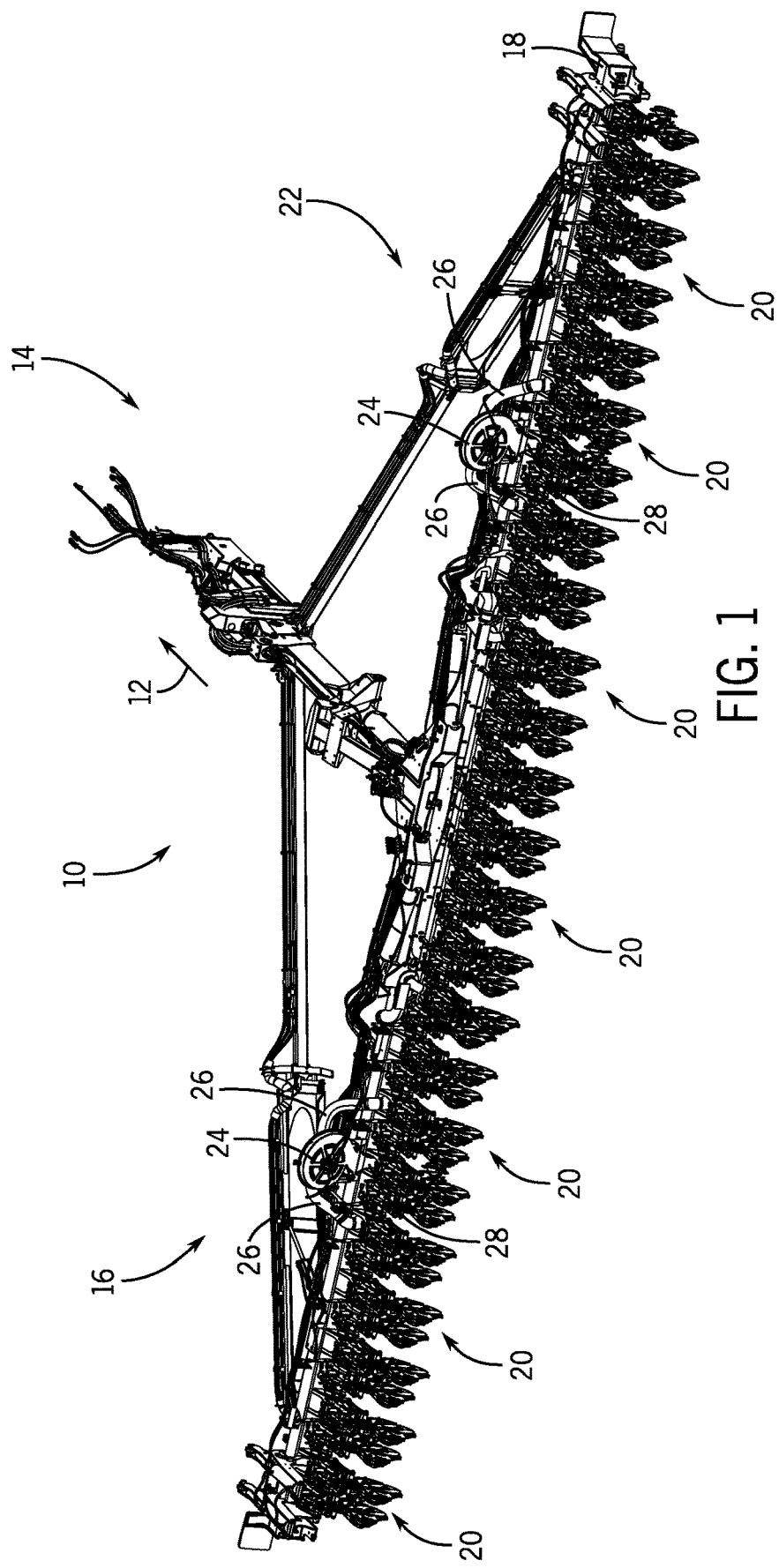
FIG. 1 is a perspective view of an agricultural implement, according to an embodiment of the disclosure.

FIG. 1 is a perspective view of an agricultural implement 10 (e.g., planting implement). The agricultural implement 10 includes a hitch assembly 14, a main frame assembly 16, a toolbar 18, row units 20, and seed tanks. In some embodiments, when a work vehicle is coupled to the implement 10 by the hitch assembly 14, the implement 10 may be towed along a direction of travel 12 by the work vehicle, such as a tractor or other prime mover.

As depicted, the hitch assembly 14 is coupled to the main frame assembly 16 and the main frame assembly 16 is coupled to the toolbar 18. Additionally, as depicted, the toolbar 18 is coupled to multiple row units 20. Thus, as the work vehicle tows the implement 10, each of the row units 20 may deposit seeds at a desired depth beneath the soil surface, thereby establishing rows of planted seeds. In some embodiments, the bulk of the seeds to be planted may be stored in seed tanks. Thus, as seeds are planted by the row units 20, a pneumatic distribution system may distribute additional seeds from the seed tanks to the individual row units 20.

It should be noted that while the illustrated implement 10 includes 47 row units, alternative implements may include more or fewer row units 20. For example, certain implements 10 may include 6, 8, 12, 16, 24, 32, or 36 row units, or more. In addition, the spacing between row units may be particularly selected based on the type of seed being planting. For example, the row units may be spaced 30 inches from one another for planting corn, and 15 inches from one another for planting soy beans.

The seeds are metered through the row units 20 with a metering system that uses vacuum pressure created by a vacuum system 22. The vacuum pressure is created by one or more fans 24 (e.g., 1, 2, 3, 4, or more) that couple to the toolbar 18 with conduits 26. In operation, the fans 24 draw air out of the toolbar 18 creating a vacuum chamber. Hoses (e.g., vacuum hoses) extend between the row units 20 and the toolbar 18, which enable the vacuum pressure to transfer to the metering system. The vacuum pressure draws air through the metering system on the row units 20, and through the hoses that couple the metering system to the toolbar 18. The air drawn or sucked out of the toolbar 18 with the fans 24 is then directed towards the ground with one or more exhaust ducts 28. For example, each fan 24 may couple to a respective exhaust duct 28. By directing the airflow toward the ground with the exhaust duct 28, the vacuum system 22 may reduce the spread of chemical coatings (e.g., pesticide, fungicide) that may separate from the seeds and that is sucked into the vacuum system 22.

Figure 2:
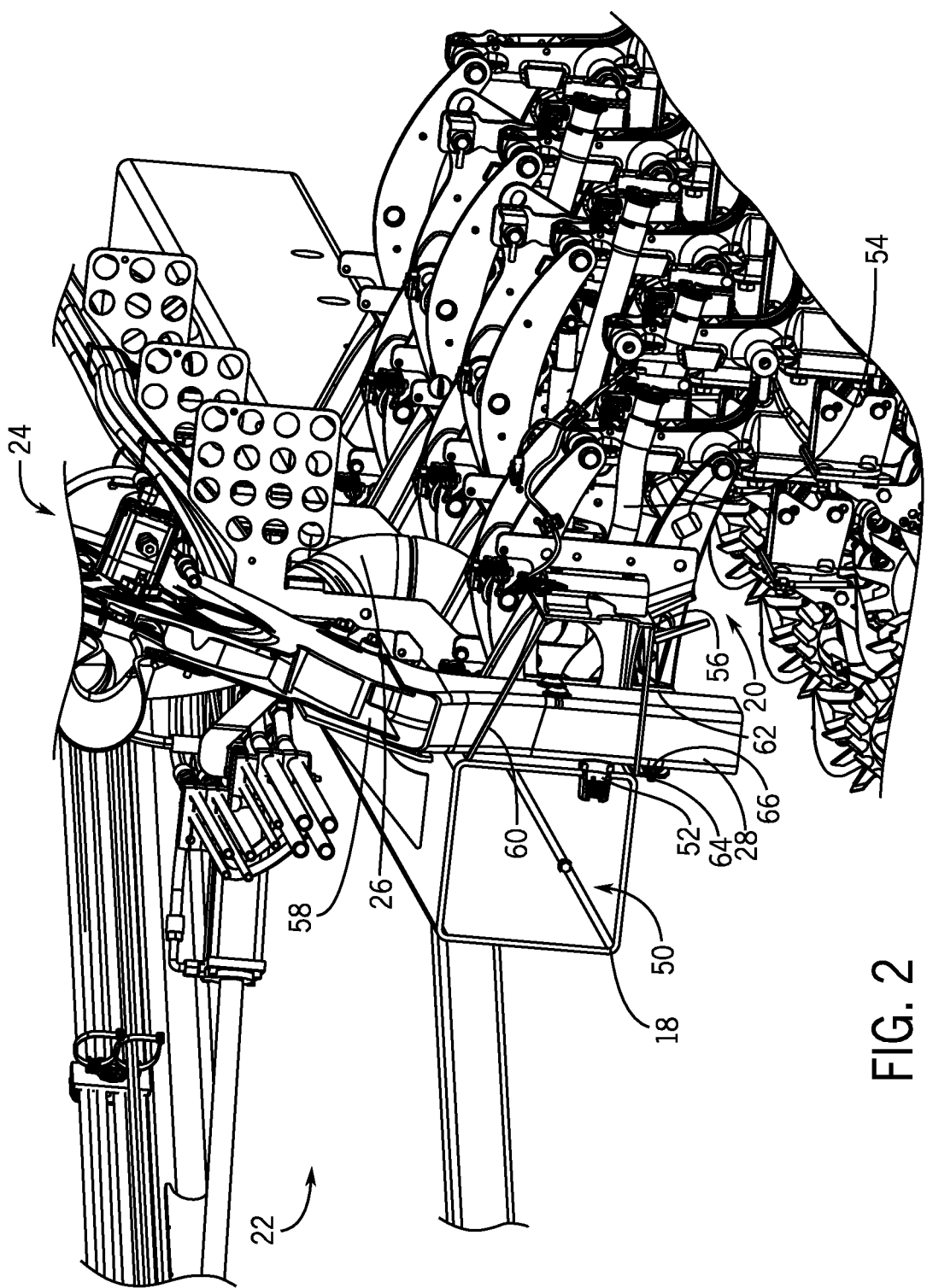
FIG. 2 is a partial cross-sectional view of a vacuum system, according to an embodiment of the disclosure.

FIG. 2 is a partial cross-sectional view of the vacuum system 22. As illustrated, the toolbar 18 forms a cavity or vacuum chamber 50. The toolbar 18 also defines a plurality of apertures 52 that enable hoses 54 to couple between the metering system and the vacuum chamber 50. The fan 24 similarly couples to the toolbar 18 with one or more conduits 26 that enable the fan 24 to draw air out of the vacuum chamber 50. As the fan 24 pulls air out of the vacuum chamber 50, air is drawn through the metering system through the hoses 54. The air enters the toolbar 18 and then flows through the toolbar 18 to the conduits 26. The conduits 26 direct the airflow to the fan 24, which then discharges the airflow through the exhaust duct 28.

As illustrated, the exhaust duct 28 couples to an outlet 58 of the fan 24 and extends through a bracket 56 (e.g., row bracket, offset row bracket). The bracket 56 couples to the toolbar 18 and provides the supporting connection between the toolbar 18 and the row unit 20. The bracket 56 defines an opening or inlet 60 and another opening or outlet 62 that enables the exhaust duct 28 to pass through the bracket 56. In addition to coupling to the fan 24, the exhaust duct 28 may also couple to the bracket 56 and/or the toolbar 18. For example, the exhaust duct 28 may couple to the bracket 56 with one or more fasteners 64 (e.g., threaded fasteners). In some embodiments, the exhaust duct 28 may be spaced from the toolbar 18. In order to create a gap between the toolbar 18 and the exhaust duct 28, the exhaust duct 28 may include one or more protrusions 66 (e.g., bosses).

Figure 3:
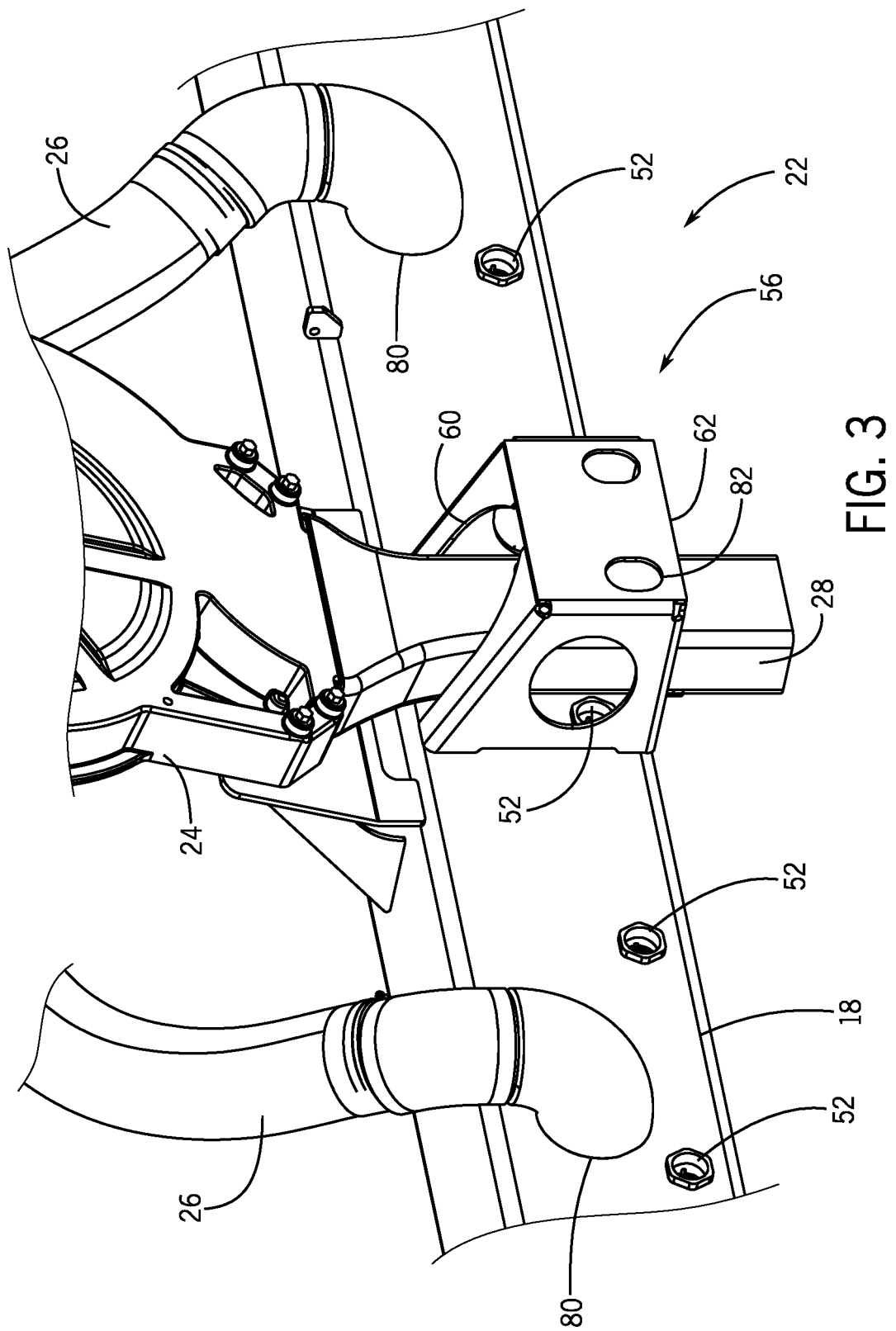
FIG. 3 is a partial perspective view of a vacuum system, according to an embodiment of the disclosure.

FIG. 3 is a partial perspective view of a vacuum system 22. As illustrated, the toolbar 18 includes apertures that enable fluid communication between the metering system and the fan 24. These apertures include hose apertures 52 that couple the metering system to the toolbar 18. The toolbar 18 also includes conduit apertures 80 that enable the fan 24 to draw air through the conduits 26 and through the toolbar 18.

As illustrated, the exhaust duct 28 couples to the fan 24 and extends through the bracket 56 (e.g., row bracket, offset row bracket). The bracket 56 couples to the toolbar 18 and provides the supporting connection for a row unit 20. The bracket 56 may define a plurality of openings including the inlet 60 and the outlet 62 that enable the exhaust duct 28 to pass through the bracket 56. In addition to these apertures, the bracket 56 may define other apertures, such as a hose aperture 82 that enable the hose 54 to extend through the bracket 56.

Figure 4:
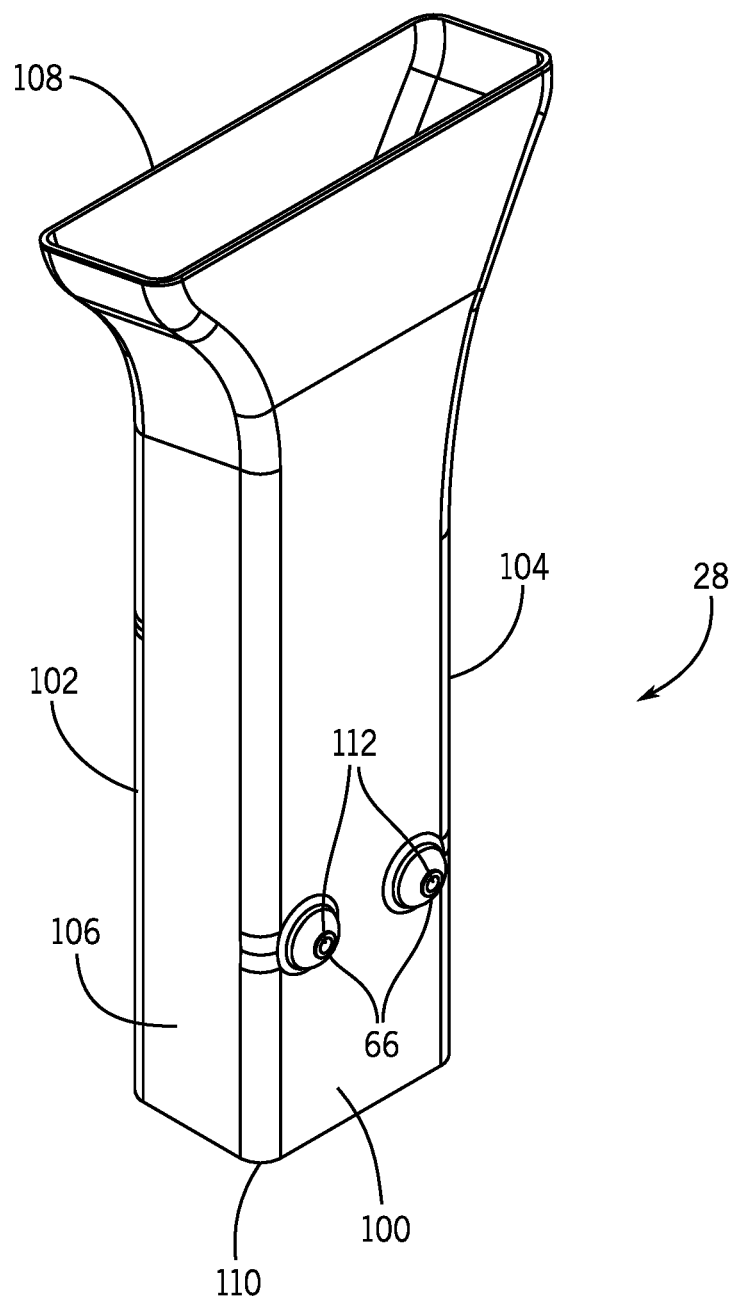
FIG. 4 is a perspective view of an exhaust duct, according to an embodiment of the disclosure.

FIG. 4 is a perspective view of an exhaust duct 28. The vacuum system 22 includes the exhaust duct 28 to direct airflow towards the ground, which may reduce the ability of particulate in the airflow from spreading. The exhaust duct 28 includes a rear wall 100, a front wall 102, a first sidewall 104, and a second sidewall 106. In operation, airflow from the fan 24 passes through the exhaust duct 28 between an inlet 108 and an outlet 110. In order to couple to the implement 10, the exhaust duct 28 may define one or more apertures 112. As illustrated, the apertures 112 are in a rear wall 100, but in some embodiments the apertures 112 may be in different walls (e.g., front wall 102, first sidewall 104, and/or second sidewall 106). In still other embodiments, the apertures 112 may be in protrusions or bosses 66 (e.g., 1, 2, 3, 4, or more) that space the exhaust duct 28 from the toolbar 18.

Figure 5:
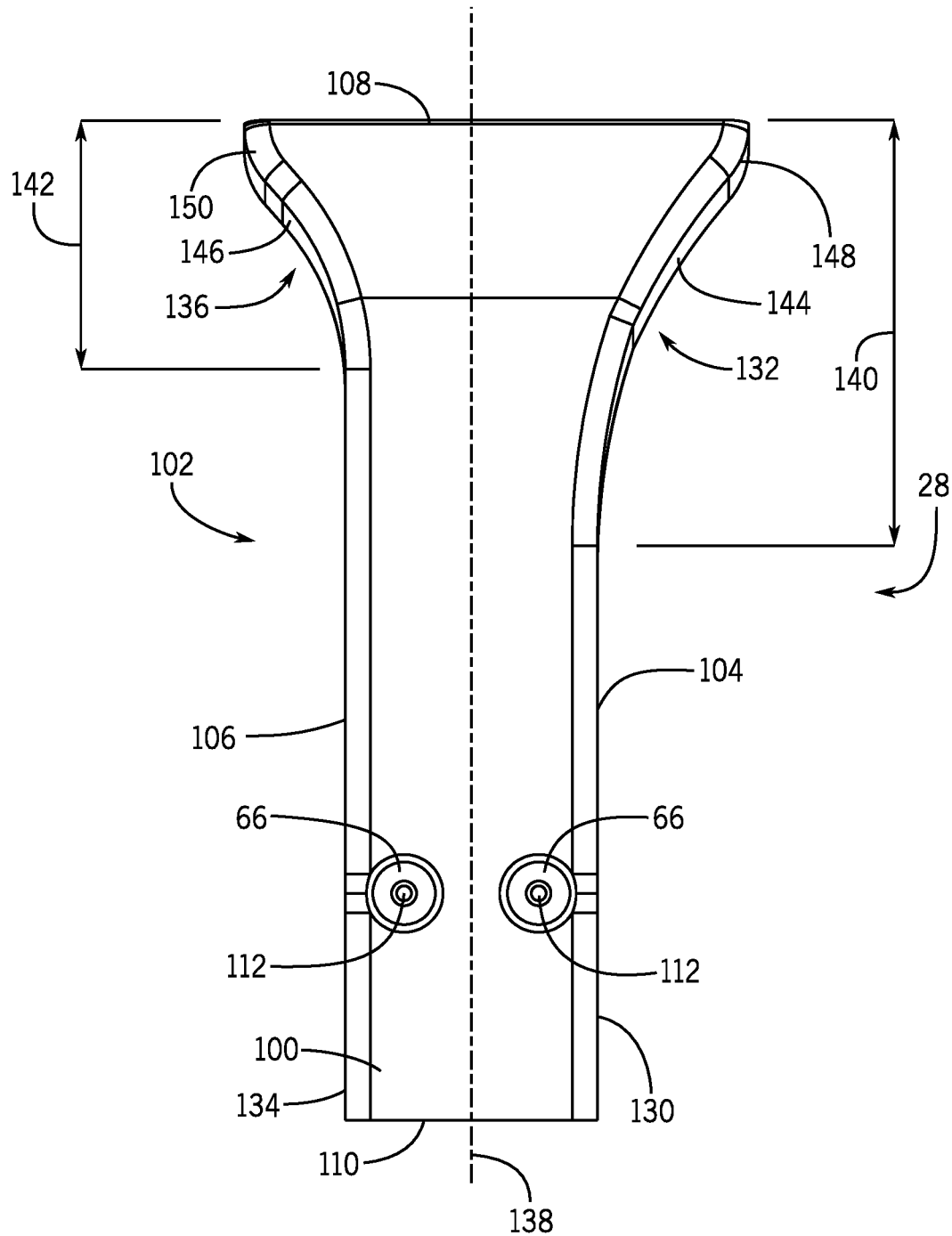
FIG. 5 is a rear view of the exhaust duct in FIG. 4, according to an embodiment of the disclosure.

FIG. 5 is a rear view of the exhaust duct 28 in FIG. 4. As illustrated, the first sidewall 104 and the second sidewall 106 may include one or more sidewall portions. For example, the first sidewall 104 may include a first sidewall straight portion 130 and a first sidewall curved portion 132. The second sidewall 106 may similarly include a second sidewall straight portion 134 and a second sidewall curved portion 136. As illustrated, the first sidewall curved portion 132 and the second sidewall curved portion 136 curve with respect to a central longitudinal axis 138 in order to decrease the width of the exhaust duct 28 at the outlet 110. The width of the exhaust duct 28 gradually reduces until the first sidewall curved portion 132 couples to the first sidewall straight portion 130, and the second sidewall curved portion 136 couples to the second sidewall straight portion 134. The change in width of the exhaust duct 28 enables the exhaust duct 28 to extend through the bracket 56. By extending through the bracket 56, the fan 24 discharges the airflow close to the ground (e.g., 6-36 inches, 6-30 inches, 6-24 inches, 6-18 inches from the ground) and thus blocks and/or reduces the spread of particulate carried in the airflow.

In some embodiments, the first sidewall curved portion 132 defines a length 140 that is greater than the length 142 of the second sidewall curved portion 136. The length 140 of the first sidewall curved portion 132 enables a greater radius of curvature that enables the gradual redirection of airflow from the inlet 108 to the outlet 110. For example, the fan 24 may not direct the airflow directly into the inlet 108 of the exhaust duct 28, or in other words the airflow may not flow parallel to the central axis 138 when entering the inlet 108. Instead, the airflow may enter the inlet 108 at an angle with respect to the central axis 138. For example, the airflow may be directed towards the first sidewall curved portion 132. As the airflow contacts the first sidewall curved portion 132, the gradual curve of the first sidewall curved portion 132 may reduce the turbulence of the airflow as the exhaust duct 28 directs the airflow to the outlet 110. As illustrated, the first sidewall curved portion 132 and the second sidewall curved portion 136 may include respective concave portions 144, 146 and respective convex portions 148, 150. The convex portions 148, 150 enable the inlet 108 to couple to the fan 24.

Figure 6:
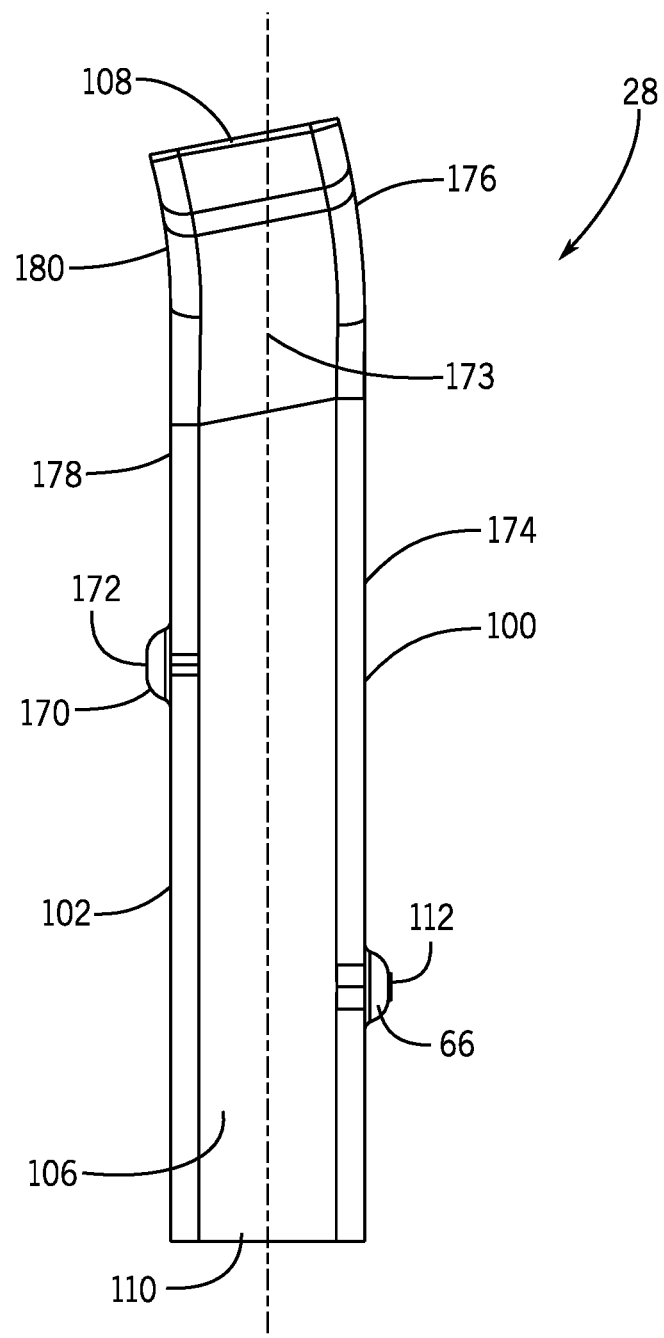
FIG. 6 is a side view of the exhaust duct in FIG. 4, according to an embodiment of the disclosure.

FIG. 6 is a side view of the exhaust duct 28 in FIG. 4. As illustrated, the rear wall 100 and the front wall 102 include respective protrusions 66 and 170. As explained above, the protrusions 66 may define apertures 112 that enable the protrusions 66 to couple to the implement 10 (e.g., bracket 56, toolbar 18). Likewise, the protrusions 170 may define apertures 172 that enable the exhaust duct 28 to couple to the implement 10 (e.g., bracket 56). Similar to the first and second sidewalls 104, 106, the rear wall 100 and the front wall 102 include curve portions with respect to a central axis 173. As illustrated, the rear wall 100 includes a straight portion 174 and a curved portion 176. The front wall 102 includes a straight portion 178 and a curved portion 180. In FIG. 6, the curved portion 176 of the rear wall 100 is convex while the curved portion 180 of the front wall 102 to his concave. In other embodiments, the opposite may occur with the curved portion 176 being concave and the curved portion 180 being convex.

Figure 7:
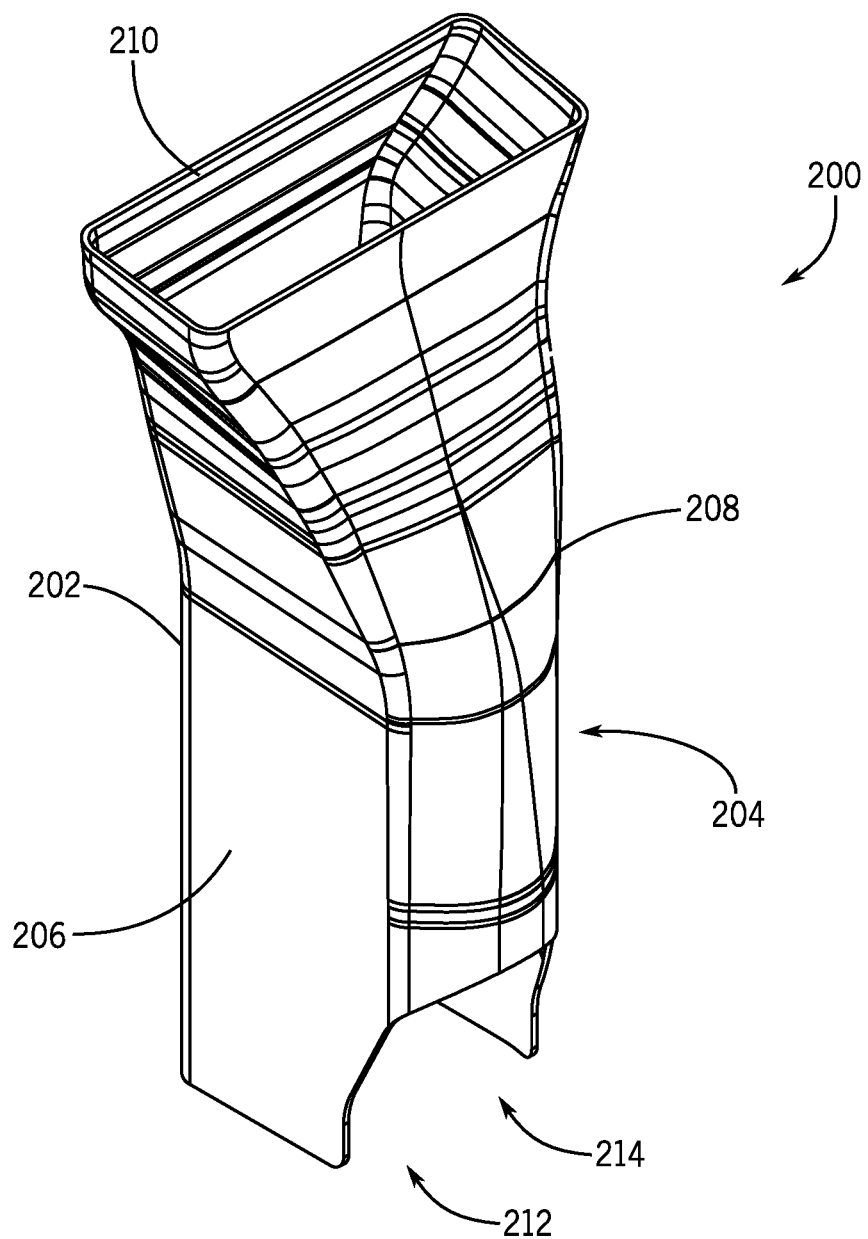
FIG. 7 is a perspective view of an exhaust duct, according to an embodiment of the disclosure.

FIG. 7 is a perspective view of an exhaust duct 200. As explained above, the vacuum system 22 includes the exhaust duct 200 to direct airflow towards the ground, which may reduce the ability of particulate in the airflow from spreading. The exhaust duct 200 includes a rear wall 202, a front wall 204, a first sidewall 206, and a second sidewall 208. In operation, airflow from the fan 24 passes through the exhaust duct 200 between an inlet 210 and an outlet 212. In some embodiments, a portion of the exhaust duct 200 may be removed to define a cutout 214. The cutout 214 may enable lifting of the row units 20 relative to the toolbar 18 during transport of the implement 10 or provide clearance for fertilizer coulters, residue clearing devices, among others that may lift or travel upwards.

Figure 8:
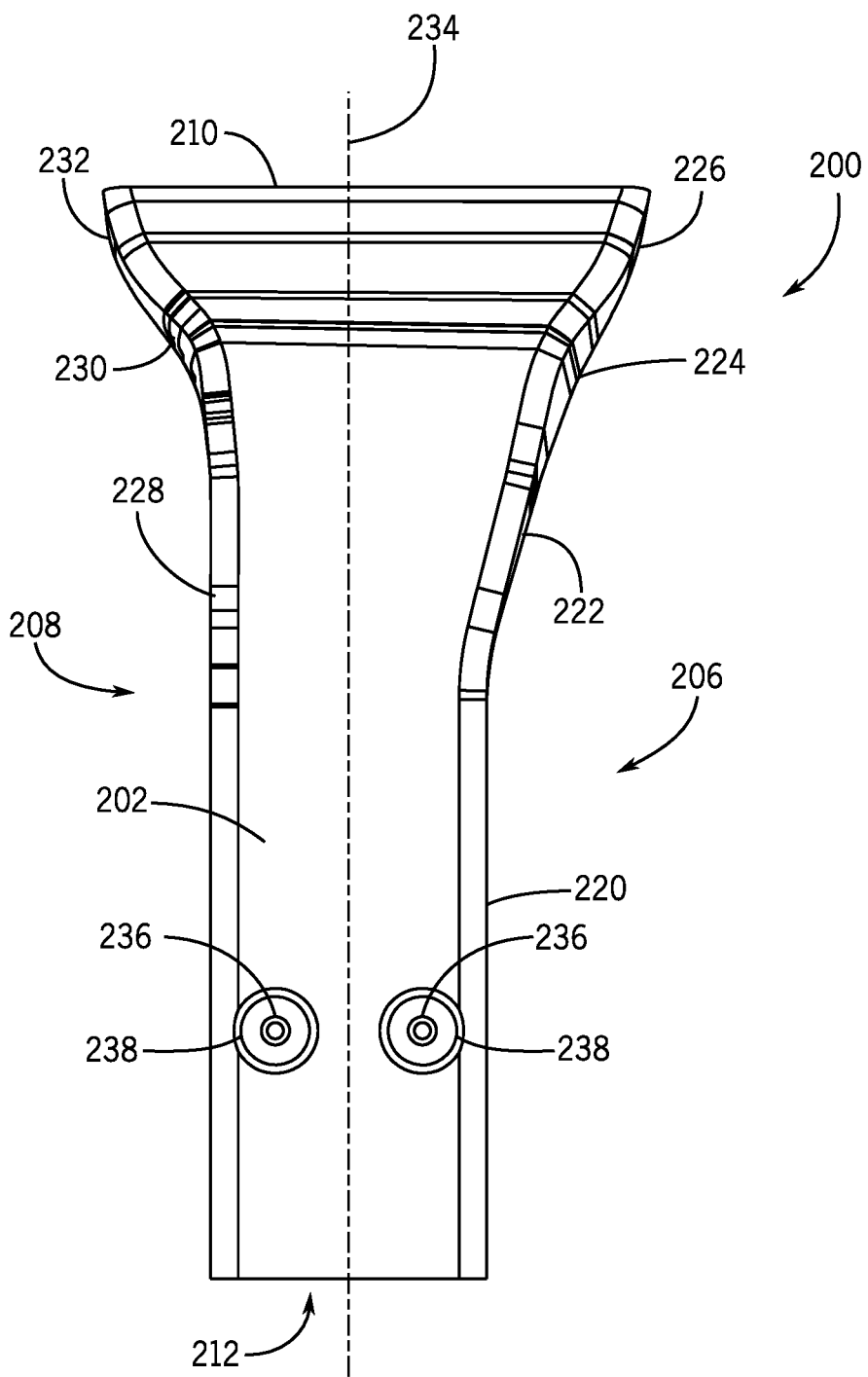
FIG. 8 is a rear view of the exhaust duct in FIG. 7, according to an embodiment of the disclosure.
Figure 9:
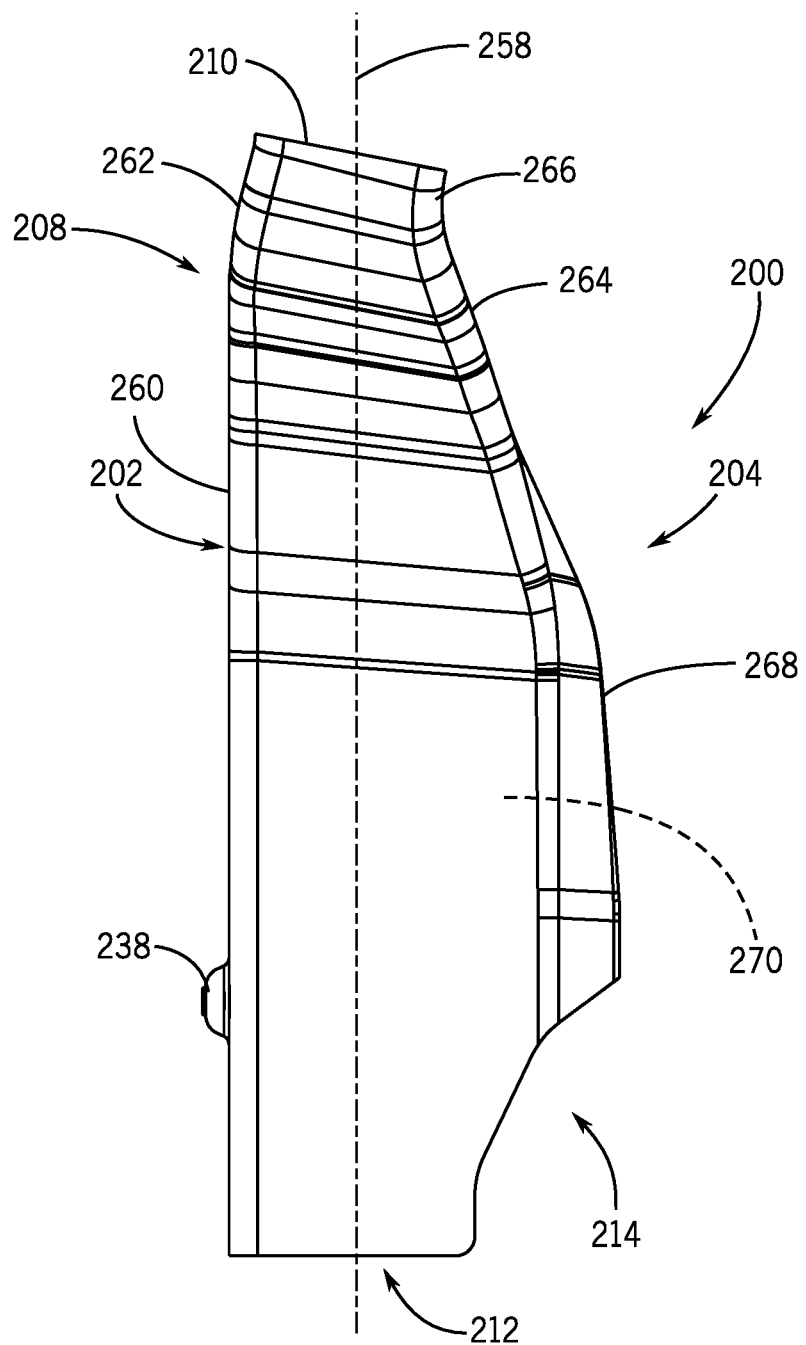
FIG. 9 is a side view of the exhaust duct in FIG. 7, according to an embodiment of the disclosure.

FIG. 8 is a rear view of the exhaust duct 200 in FIG. 7. As illustrated, the first sidewall 206 and the second sidewall 208 may include one or more sidewall portions. For example, the first sidewall 206 may include a first straight portion 220, a second straight portion 222, a first curved portion 224, and a second curved portion 226. The second sidewall 208 may similarly include a first straight portion 228, a first curved portion 230, and a second curved portion 232. As illustrated, the second straight portion 222 is angled with respect to the first straight portion 220 of the first sidewall 206, which increases the size of the exhaust duct 200 between the inlet 210 and the outlet 212. Coupled to the second straight portion 222 is the first curved portion 224 which in turn couples to the second curved portion 226. The first curved portion 224 may be concave while the second curved portion 226 may be convex. Similarly, the straight portion 228 of the second sidewall 208 couples to the first curved portion 230, which then couples to the second curved portion 232. The second sidewall's 208 first curved portion 230 may be concave while the second curved portion 232 may be convex. As illustrated, the overall width of the exhaust duct 200 gradually reduces until the second straight portion 222 contacts the first straight portion 220 of the first sidewall 206. The change in width of the exhaust duct 200 enables the exhaust duct 200 to extend through the bracket 56. By extending through the bracket 56, the fan 24 discharges the airflow close to the ground and thus blocks and/or reduces the spread of particulate carried in the airflow.

As illustrated, the inclusion of the second straight portion 222 enables the gradual redirection of airflow from the inlet 210 to the outlet 212. For example, the fan 24 may not direct the airflow directly into the inlet 210 of the exhaust duct 28, or in other words the airflow may not flow parallel to a central axis 234 when entering the inlet 210. Instead, the airflow may enter the inlet 210 at an angle with respect to the central axis 234. For example, the airflow may be directed towards the first curved portion 224 of the first sidewall 206. As the airflow contacts the first curved portion 224, the gradual curve of the first curved portion 224 and the second straight portion 226 may reduce the turbulence of the airflow as the exhaust duct 200 directs the airflow to the outlet 212.

In order to couple to the implement 10, the exhaust duct 200 may define one or more apertures 236. The apertures 236 enable fasteners (e.g., threaded fasteners) to couple the exhaust duct 200 to the implement 10. In still other embodiments, the apertures 236 may be in protrusions or bosses 238 (e.g., 1, 2, 3, 4, or more) that space the exhaust duct 200 from the toolbar 18.

FIG. 9 is a side view of the exhaust duct 200 in FIG. 7. Similar to the first and second sidewalls 206, 208, the rear wall 202 and the front wall 204 include curve portions with respect to a longitudinal axis 258. As illustrated, the rear wall 202 includes a straight portion 260 and a curved portion 262. The front wall 204 also includes a straight portion 264 and a first curved portion 266. In FIG. 7, the curved portion 262 of the rear wall 202 is convex while the first curved portion 266 of the front wall 204 is concave. In other embodiments, the opposite may occur with the curved portion 262 being concave and the first curved portion 266 being convex. The exhaust duct 200 may also include a second curved portion 268. The second curved portion 268 increases the size of the cavity 270 within the exhaust duct 200. By increasing the size of the cavity 270 between the inlet 210 and the outlet 212, the exhaust duct 200 may decrease the turbulence or swirl of the airflow and thus the efficiency of the airflow through the exhaust duct 200.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vacuum system, comprising:
- a toolbar;
- a row unit bracket configured to individually couple a respective row unit to the toolbar;
- a fan coupled to the toolbar and configured to draw air through a metering system of the respective row unit; and
- an exhaust duct extending through the row unit bracket, wherein the exhaust duct is coupled to the fan and configured to discharge airflow from the fan toward a ground.

2. The system of claim 1, wherein the exhaust duct comprises a front wall, a rear wall, a first sidewall, and a second sidewall.

3. The system of claim 2, wherein the front wall, the rear wall, the first sidewall, and the second sidewall extend from a first end of the exhaust duct to a second end of the exhaust duct.

4. The system of claim 2, wherein the first sidewall comprises a first curved portion and a first straight portion and the second sidewall comprises a second curved portion and a second straight portion.

5. The system of claim 4, wherein the first curved portion is longer than the second curved portion.

6. The system of claim 2, wherein the exhaust duct defines an inlet and an outlet, wherein a first area of the inlet is greater than a second area of the outlet.

7. The system of claim 6, wherein the inlet is angled with respect to a central longitudinal axis of the exhaust duct.

8. The system of claim 6, wherein the front wall or the rear wall comprises a boss configured to couple to the planter frame or the row unit bracket.

9. A vacuum system, comprising:
a row unit bracket configured to individually couple a respective row unit to a toolbar; and
an exhaust duct extending through the row unit bracket, wherein the exhaust duct is configured to couple to a fan configured to draw air through a metering system of the respective row unit, and the exhaust duct is configured to discharge airflow from the fan toward a ground.

10. The system of claim 9, wherein the exhaust duct comprises a front wall, a rear wall, a first sidewall, and a second sidewall.

11. The system of claim 10, wherein the rear wall and the front wall define different lengths.

12. The system of claim 10, wherein a first width of the first sidewall and a second width of the second sidewall change from an inlet of the exhaust duct to an outlet of the exhaust duct.

13. The system of claim 10, wherein the first sidewall comprises a first curved portion and a first straight portion and the second sidewall comprises a second curved portion and a second straight portion.

14. The system of claim 13, wherein the second curved portion is longer than the first curved portion.

15. The system of claim 10, wherein the front wall curves between the first sidewall and the second sidewall.

16. The system of claim 10, wherein a first end of the exhaust duct is angled with respect to a second end of the exhaust duct.

17. The system of claim 10, wherein the rear wall comprises a boss configured to couple to the planter frame or the row unit bracket.

18. A vacuum system, comprising:
an exhaust duct extending through a row unit bracket, wherein the exhaust duct is configured to couple to a fan configured to draw air through a metering system of a respective row unit, the exhaust duct is configured to discharge airflow from the fan toward a ground, the row unit bracket is configured to individually couple the respective row unit to a toolbar, and the exhaust duct comprises:
a front wall;
a rear wall;
a first sidewall comprising a first curved portion and a first straight portion; and
a second sidewall comprising a second curved portion and a second straight portion.

19. The system of claim 18, wherein the first curved portion is longer than the second curved portion.

20. The system of claim 18, wherein the exhaust duct defines an inlet and an outlet, wherein a first area of the inlet is greater than a second area of the outlet.

* * * * *